United States Patent Office 3,348,309
Patented Oct. 24, 1967

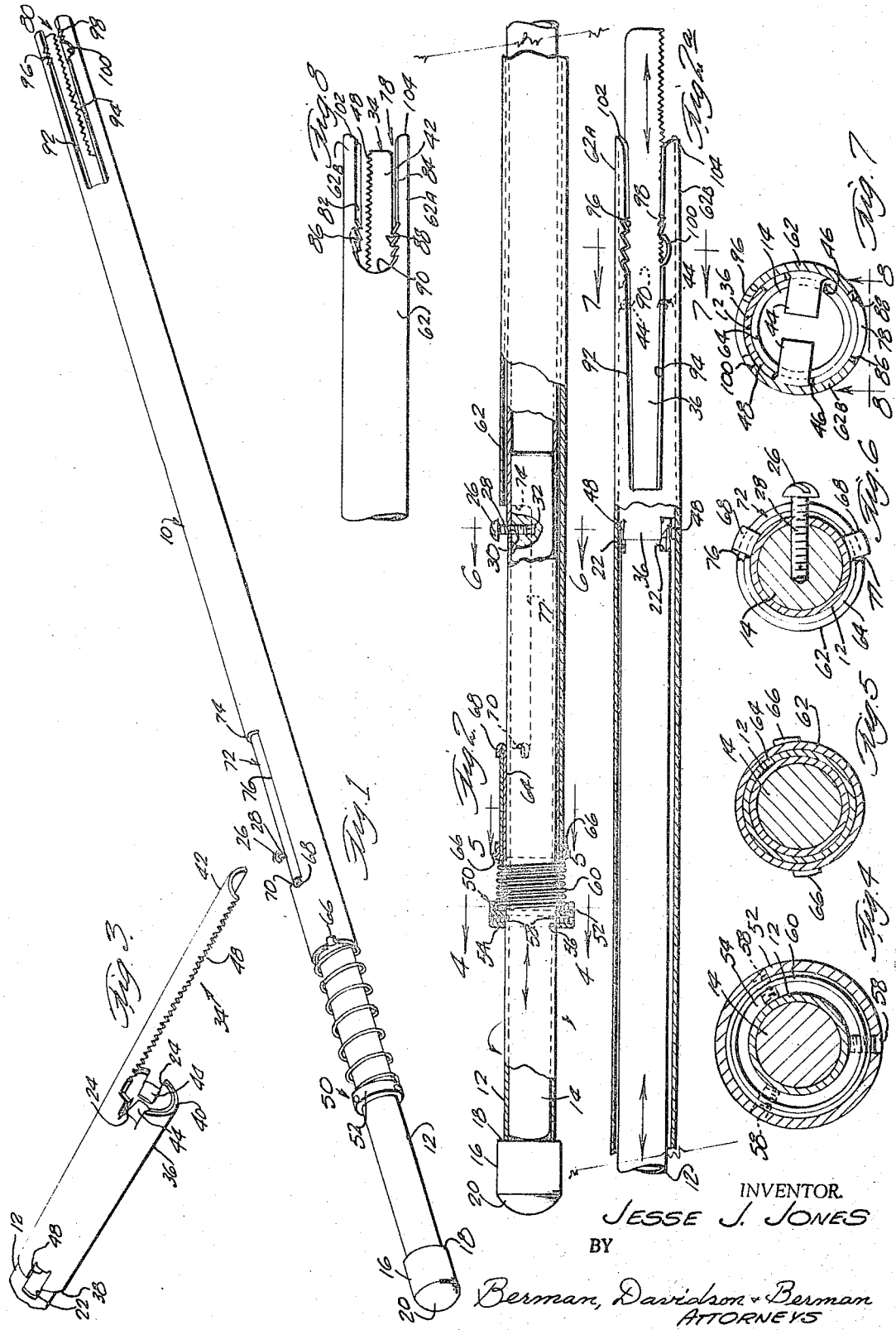

3,348,309
PRUNING IMPLEMENT
Jesse J. Jones, R.R. 1, Box 110, La Grange, N.C. 28551
Filed Jan. 25, 1966, Ser. No. 522,944
9 Claims. (Cl. 30—166)

This invention relates to the general field of manually-operable tools or implements and, more specifically, the instant invention pertains to a pruning implement in the nature of a reciprocable saw.

To those persons skilled in the art of pruning or in the trimming of trees, bushes, shrubs, vines, flowers and other similar growths, it is not infrequent that one encounters a situation rendering the pruning or trimming operation almost impossible to accomplish with conventional tools or implements which have been heretofore known in the art. The general inaccessibility of the limb, tree, stem or other twig to be severed from its main growth is usually occasioned by profuse and dense growths in the path of the operator or in the path of the tool or implement, or both, all of which makes it practically impossible or impractical to attempt the pruning operation. Additionally, the prior art teaches, in the main, use of pruning tools wherein the cutting element or elements and the actuating means therefor are, for the most part, wholly exposed, thereby permitting such implements to become entangled in growths disposed between the operator and the bush, tree, shrub, et cetera, on which the pruning operation is to be made. If, ultimately, the operator of pruning implements of the type known in this art is successful in carrying out the pruning operation, the damage meted out to the shrubbery and other plant life in the path of the operator or tool renders the pruning operation impractical from the standpoint of cost.

The disadvantages of conventional pruning mechanisms of the reciprocating or scissors-types, aside and apart from those noted supra, are too numerous to detail herein, but among the uses it should be specifically mentioned that in the use of reciprocating pruning tools such as, for example, flat-bladed saws, the limbs or branches of the shrubs, bushes or trees which are being removed tend to bend and bind against the blade, thereby requiring excessive force to be used by the operator in effecting the severance and this, in turn, frequently and upon the completion of the cut, permits the blade to run free and uncontrolled to the ultimate damage of either the adjoining limbs or to the bark of the trunk of the shrub or bush immediately adjacent thereto.

It is, therefore, one of the primary objects of this invention to provide a pruning tool of improved construction and employing a reciprocating relatively thin saw-type blade, and wherein the disadvantages of related tools or implements are overcome, obviated or avoided while, at the same time, providing an implement that may be operated at optimum efficiency under the most difficult of conditions.

Another object of this invention is to provide a reciprocable pruning implement wherein the reciprocating blade is substantially sheathed throughout its length and during the operable cycle thereof.

A further object of this invention is to provide a reciprocable pruning implement which will not bind as it cuts and which will make a smooth and clean cut at the point of severance.

It is still another object of this invention to provide a manually-operable pruning implement of but a minimum number of component elements and which may be easily disassembled for repair, sharpening, replacement or other maintenance, should the same be required.

A still further object of this invention is to provide a pruning implement with means for firmly holding the twig, branch or limb thereon as the reciprocating saw blade effects a clean quick separation thereof.

Continuing as a further object of the present invention, it is proposed to provide a pruning implement which is operable to cut overhead twigs, branches or stems and limbs disposed at substantially any position above ground, and wherein means are incorporated in the implement to draw the branch at an angle to the direction of movement of the cutting blade.

It is another object of this invention to provide a device of the type to which general reference has been made wherein the construction of the device offers a minimum of simplicity, efficiency, economy, and ease of operation and assembly.

This invention contemplates, as still another object thereof, the provision of a pruning implement or tool which is non-complex in construction and assembly, inexpensive to manufacture and maintain, and which is durable in use.

Other and further objects and advantages of the instant invention will become more manifest from a consideration of the following specification when read in conjunction with the annexed drawing, in which:

FIGURE 1 is a perspective view of a pruning tool or implement constructed in accordance with the teachings of this invention;

FIGURE 2 is a fragmentary side elevational view of one end portion of the implement, partly broken away, and showing the relative positions and assembly of the component elements of the device at this end of the implement;

FIGURE 2a is a fragmentary side elevational view of the other end portion of the implement, this view also being partly broken away to illustrate the relative positions and assembly of the component elements of the device at this end of the implement;

FIGURE 3 is a fragmentary perspective view of the cutting blade and its mounting means;

FIGURE 4 is an enlarged detail cross-sectional view, FIGURE 4 being taken substantially on the vertical plane of line 4—4 of FIGURE 2, looking in the direction of the arrows;

FIGURE 5 is an enlarged detail cross-sectional view, FIGURE 5 being taken substantially on the vertical plane of line 5—5 of FIGURE 2, looking in the direction of the arrows;

FIGURE 6 is an enlarged fragmentary detail cross-sectional view, FIGURE 6 being taken substantially on the vertical plane of line 6—6 of FIGURE 2, looking in the direction of the arrows;

FIGURE 7 is an enlarged detail cross-sectional view, FIGURE 7 being taken substantially on the vertical plane of line 7—7 of FIGURE 2a; and FIGURE 8 is a fragmentary side elevational view of the outer end of the cutting blade sheath.

Referring now more specifically to the drawing, reference numeral 10 designates, in general, a pruning device, implement or tool constructed in accordance with the teachings of this invention and wherein the implement is especially designed for the pruning of limbs, twigs, branches, leaves and the like from trees, bushes, shrubs, and other similar kinds of plant-life wherein the pruning thereof is essential and wherein such operations may, necessarily, have to be carried out under situations wherein access to the point of pruning is practically inaccessible for an operator using the conventional and well-known pruning equipment. The pruning implement according to this invention is seen to comprise an elongated substantially hollow tubular cylindrical saw-blade support 12 in one end of which is telescopically and releasably-fitted an elongated substantially solid cylindrical plug 14 having an enlarged outer axially-elongated cylindrical butt 16 at one end thereof engaging the outer terminus of the aforementioned one end of the support 12 and defining a circumferential shoulder 18 therebetween. The butt 16 may be finished, if desired, in an outer dome-shaped end 20.

The cylindrical support 12, adjacent to, but spaced inwardly from its other end, is formed with a plurality of axially-elongated circumferentially-spaced transversely-extending slots 22, and the aforementioned other end of the support 12 is provided with a plurality of inwardly-extending outwardly-opening transverse and circumferentially-spaced slots 24 axially-aligned with the slots 22. As is seen in the several figures, the slots 22 are diametrically-opposed with respect to one another as are the slots 24.

The support 12 and the plug 14 are releasably-secured together and held against axial shifting movement relative to one another by means of a connecting bolt 26 having a threaded shank 28 that extends transversely through a tapped opening 30 formed in the support 12 intermediate the ends thereof, and into a suitable radially-extending pocket 32 formed in the plug 14.

The reciprocable saw blade is generally indicated by reference numeral 34 and is seen to include a substantially hollow cylindrical base 36 having a pair of opposed open ends 38, 40, and from the forward end 40 axially-projects an elongated integrally-connected curvilinear blade 42. The transverse arcuate length of the blade 42 is less than 180° in order that a pair of diametrically-opposed tongues may be struck inwardly from the outer end 40 of the base 36. As is seen in FIGURES 2a and 3, the cylindrical base 36 is telescoped over the outer terminal end of the support 12 with the tongues 44 entering the slots 24 and engaging against the lower ends 46 thereof (see FIGURE 7) thereby limiting the relative movement of the base 36 inwardly with respect to the support 12. The other or inner end 38 of the base 36 is similarly struck, cut or punched to form diametrically-opposed inwardly extending tongues 48 which overlap the adjacent ends of the slots 22 thereby locking the base 36 on the support 12 and preventing axial movement of the base 36 outwardly of the support 12. The base 36, is, thus, effectively prevented from shifting in either direction relative to the support 12. The blade 42 is completed by providing a plurality of serrations 48 along a longitudinally-extending side edge thereof.

Telescoped over the support 12 is an annular stop element 50 having a cylindrical sidewall 52 and an end wall 54 centrally-apertured as at 56 to receive the support 12 therethrough. To serve a function to be described infra, the stop element 50 is held in adjusted position relative to the support 12 by means of a plurality of radially-extending set screws 58.

Closely-mounted over the support 12 is an elongated helicoidal spring 60 (see FIGURE 2), the spring having one of its ends seating against the end wall 54 and being partially surrounded by the sidewall 52. The other end of the helicoidal spring 60 makes bearing engagement against one end of an elongated substantially hollow tubular cylindrical sleeve 62 which is loosely-telescoped over that end of the support 12 remotely-disposed with respect to the butt 16. At the inner terminus of this end of the sleeve 62 is fitted an axially-elongated substantially hollow cylindrical bushing 64 (see FIGURE 2), the bushing 64 being provided with a plurality of reverted fingers 66 circumferentially-spaced about one end thereof and overlapping the inner end of the sleeve 62. The bushing 64 is provided, at its other end, with a second set of reverted fingers 68 which overlie the inner end 70 of an elongated slot 72 that extends transversely through and axially of the sleeve 62. As is seen in FIGURE 1, the bolt 26 projects radially from the plug 14 through the slot 72 in which the bolt 26 is axially-movable and swingable. The bolt 26 in moving between the ends 70, 74 of the slot 72, defines the reciprocable distance that the blade 42 may be moved relative to the sleeve 62. The swinging movement of the bolt 26 is limited, of course, by the arcuate distance between the sidewalls 76, 77 defining the width of the slot 72.

The other or outer end of the sleeve 62 is provided with a pair of diametrically-opposed inwardly-extending and outwardly-opennig slots 78, 80 wherein the side edges 82, 84 of the slot 78 are serrated as at 86, 88 and are in open communication with a rounded bight portion 90, and the edges 92, 94 of the slot 80 are serrated as at 96, 98 adjacent the outer end of the sleeve 62 with the inner end of the serrations 98 opening in a hook-shaped cut-out 100 preferably diametrically-opposed to the bight portion 90. The outer ends of the sleeve 62 are preferably rounded as at 102, 104 to assure easy entrance of this end of the sleeve into heavy growths without snagging or hooking.

Having described one embodiment of this invention in detail with respect to the annexed drawing, the operation thereof is deemed to be self-evident. A brief description, however, for the purpose of clarity is set forth below.

The operator of the implement 10, having selected a twig or branch to be severed, manually-extends the outer end of the sleeve toward the branch and manipulates the sleeve 62 in such a manner as to force the branch into the slot 78, 80 until the same becomes engaged within the rounded bight 90, it being understood that the operator has retracted the blade 42 within the outer end of the sleeve 62 and has positioned the same in juxtaposition relative to those portions 62A or 62B of the sleeve 62 which extend between the slots 78, 80. It should be understood that the arcuate length of the blade 42 is substantially equal to, but preferably not greater than the arcuate length of the portions 62A, 62B and that the support 12 has an axial length greater than the axial length of the sleeve 62. In making the original movement of the implement 10 as described above in the direction toward the branch to be pruned, the blade 42 is preferably turned in such a manner as to leave the slots 78, 80 completely open. With the branch or limb disposed in the above-described position, the operator turns the support 12 in such direction as to cause the serrated edge 48 to engage the branch, after the operator forces the support 12 and blade 42 connected therewith to reciprocate and gradually turns the same in the direction of the branch as the cut continues. When the cut is completed, it will be found to be smooth and exactly at the point of desired severance.

In the cutting operation, the operator may draw the limb or branch toward him by frictionally-engaging the serrations 86, 88, 96, 98 therewith and forcing the hook portion 100 thereover. This has the advantage of drawing the severed portion of the limb as it is being cut away from its stump so as to prevent the blade 42 from binding in the cut.

Having described and illustrated one embodiment of this invention in detail, it will be understood that the same is offered merely by way of example, and that this invention is to be limited only by the scope of the appended claims.

What is claimed is:

1. A pruning implement comprising an elongated cylindrical support having a pair of opposed ends, an elongated blade having a pair of opposed ends and a pair of longitudinally-extending spaced-apart edges, said blade being arcuate in cross-section and having an end thereof fixedly-secured to one end of said support and with one of said edges comprising a cutting edge, an elongated substantially hollow cylindrical sleeve having a pair of opposed open ends, said sleeve having one end thereof telescoped over said one end of said support and normally positioned adjacent said other end of said support, said sleeve having its other end normally sheathing said blade, said support having a longitudinal axis greater than the longitudinal axis of said sleeve and being reciprocable and rotatable within and relative to said sleeve, and the other end of said sleeve having opposed transversely-extending slots formed therein to receive the limb to be pruned therethrough.

2. A pruning implement as defined in claim 1, wherein said cutting edge is serrated, and resilient means is interposed intermediate said support and said sleeve constantly biasing said sleeve for movement in a direction away from said one end of said support.

3. A pruning implement as defined in claim 2, and means on said support cooperating with means on said sleeve limiting the length of reciprocable movement in each direction of said support relative to said sleeve and the degree of rotation of said support relative to said sleeve.

4. A pruning implement as defined in claim 3, wherein said resilient means includes tension-adjusting means adjustably-mounted on said support adjacent said one end thereof, a helicoidal spring surrounding said support and having an end abutting said adjustable means and its other end abutting means on said one end of said sleeve.

5. A pruning implement as defined in claim 4, wherein said support and sleeve comprise elongated tubular members of which said sleeve is hollow throughout its length, and the other end of said sleeve is provided with a pair of inwardly-extending outwardly-opening confronting and longitudinally-extending slots with each edge defining said slots being serrated.

6. A pruning implement as defined in claim 5, wherein said hook means is disposed adjacent the inner end of said serrations at one of said edges defining one of said slots.

7. A pruning implement as defined in claim 6, wherein said adjusting means includes an element projecting laterally away from said one end of said support.

8. A pruning implement as defined in claim 7, wherein said cooperating means includes an element projecting laterally from said support, and said sleeve is provided with a longitudinally-extending elongated slot having opposed ends and sides to receive said element therethrough, said element abutting said opposed ends of said slot to limit the longitudinal reciprocation of said support relative to said sleeve and being engageable with said sides of said slot to limit rotation of said sleeve in opposite directions.

9. A pruning implement as defined in claim 1, wherein said cutting edge of said blade is provided with longitudinally-extending serrations, and wherein said blade and the sheathing end of said sleeve are curvilinear in transverse cross-section.

References Cited
UNITED STATES PATENTS 1,485,261   2/1924   Fearing _____ 145—31

FOREIGN PATENTS 971,479   7/1950   France.

WILLIAM FELDMAN, *Primary Examiner.*

R. V. PARKER, *Assistant Examiner.*